US006394257B1

(12) United States Patent
Wheeler (10) Patent No.: US 6,394,257 B1
(45) Date of Patent: May 28, 2002

(54) BIDIRECTIONAL CONVEYOR ELEVATOR

(75) Inventor: Tracy Eugene Wheeler, Terre Haute, IN (US)

(73) Assignees: Sony Corporation, Tokyo (JP); Digital Audio Disc Corporation, Terre Haute, IN (US)

( * ) Notice: Subject to any disclaimer, the term of this patent is extended or adjusted under 35 U.S.C. 154(b) by 128 days.

(21) Appl. No.: 09/583,487

(22) Filed: May 31, 2000

(51) Int. Cl.$^7$ ................................................ B65G 47/04
(52) U.S. Cl. ...................................................... 198/369.6
(58) Field of Search ............................. 198/396.6, 463.3

(56) References Cited

U.S. PATENT DOCUMENTS

| | | | | |
|---|---|---|---|---|
| 3,921,789 A | * | 11/1975 | Goldinger et al. ....... | 198/369.6 |
| 4,729,467 A | | 3/1988 | Vanderlinde ................ | 198/603 |
| 5,564,264 A | * | 10/1996 | Decrane .............. | 198/369.6 X |
| 5,806,661 A | * | 9/1998 | Martin et al. .......... | 198/781.06 |
| 5,906,288 A | * | 5/1999 | Kalm ..................... | 198/781.06 |
| 5,909,798 A | | 6/1999 | Shaver et al. ............... | 198/586 |
| 5,927,477 A | * | 7/1999 | Meittunen .................... | 198/788 |
| 6,164,512 A | * | 12/2000 | Raffoni ......................... | 227/152 |

* cited by examiner

Primary Examiner—Joseph D. Pape
Assistant Examiner—Lori L. Coletta
(74) Attorney, Agent, or Firm—Wood, Herron & Evans, L.L.P.

(57) ABSTRACT

An elevatable conveyor for moving articles between different material handling equipment comprises a frame and a carriage mounted on the frame to move in a substantially vertical direction with respect to the frame. The carriage carries first and second conveyors capable of moving the material thereon and having different vertical elevations on the carriage. A cylinder is connected to the frame, and the cylinder has a cylinder rod connected to the carriage. The cylinder is operable to move the carriage and the first and second conveyors in a substantially vertical direction between first and second vertical positions.

21 Claims, 6 Drawing Sheets

BIDIRECTIONAL CONVEYOR ELEVATOR

FIELD OF THE INVENTION

This invention relates to material handling and more particularly, to a multilevel conveyor section movable to different elevations.

BACKGROUND OF THE INVENTION

Ongoing efforts to increase the efficiency and output of production operations have resulted in a continuing focus on how materials are moved in a manufacturing environment. In many environments, it is desirable to automatically move materials without human intervention. For example, parts are often buffered or temporarily stored in a material handler, for example, an automated parts buffer ("APB"), an automated storage and retrieval system ("ASRS"), etc.; and the parts are moved between the ASRS and part processing stations or equipment by material handlers, for example, an automated guided vehicle ("AGV"). In many applications, the AGV carries the parts in a stacked configuration, that is, at two different vertical levels or heights, thereby increasing the capacity and flexibility of the AGV. For example, being able to buffer or carry parts on conveyors on the AGV at two different heights, doubles the load carrying capacity of the AGV and permits an AGV to simultaneously transfer multiple parts with other part handling equipment, for example, an ASRS or a part processing station. Consequently, an AGV can transfer parts to or from, or simultaneously to and from, other part handling equipment. Thus, the AGV has significant flexibility in interfacing with other part handling equipment.

If an AGV must handle parts on conveyors at two different elevations, then the vertical distance separating the conveyors on the AGV must be the same as the vertical distance separating conveyors on the part handling equipment interfacing with the AGV. Commercial specifications of different equipment manufacturers facilitate obtaining a common separation between the conveyors on the AGV and its associated part handling equipment. However, the height or vertical position of the conveyors on the AGV with respect to a floor is often different from the vertical position of the conveyors on the part handling equipment associated with the AGV. Therefore, in transferring parts from stacked conveyors on the AGV, the parts must often be moved vertically up or down prior to the parts being at a height that matches the height of the conveyors on the associated part handling equipment.

If the vertical positions of the conveyors on the AVG and the vertical positions of the associated part handling equipment are different, then a direct transfer of parts between the AGV and the part handling equipment cannot occur. Under these conditions, in some applications, the parts are manually moved between the AGV to its associated equipment which is normally undesirable in an otherwise fully automated environment. In other applications, the parts are moved with inclined conveyors between the AGV and the associated part handling equipment. Inclined conveyors can take the form of linear or spiral conveyors, and both devices consume a significant area or floor space, thereby limiting their potential benefits and economies. Another option is to use a scissors lift. However, the requirement of providing a scissors lift with two vertically separated pass-through conveyors results in a scissors lift that is relatively complicated in design and expensive.

Consequently, there is a need for a material handling system that can transfer multiple parts from an AGV to associated part handling equipment having different elevations and that does not have the limitations and disadvantages of known devices.

SUMMARY OF THE INVENTION

The present invention provides a simple, compact, inexpensive and reliable elevatable conveyor section that may be used to interconnect existing conveyors having different heights. The elevatable conveyor section is especially useful for those applications in which floor space is at a premium, and it is desired to minimize the area consumed by the conveying elements.

According to the principles of the present invention and in accordance with the preferred embodiments, the invention provides an elevatable conveyor for moving articles between different material handling equipment. The elevator conveyor has a frame and a carriage supported by the frame which moves in a substantially vertical direction with respect to the frame. The carriage carries first and second conveyors capable of moving the material thereon and having different vertical locations on the carriage. A cylinder is connected to the frame, and the cylinder has a cylinder rod connected to the carriage. The cylinder is operable to move the carriage and the first and second conveyors in a substantially vertical direction between first and second vertical positions.

In one aspect of the invention, the conveyor elevator includes a first sensor for detecting a presence of an article on the first conveyor; and a second sensor for detecting a presence of an article on the second conveyor.

In another embodiment of the invention, a method is provided of transferring articles between first and second material handlers and first and second conveyors on a conveyor elevator. First, the conveyor elevator is located between the first and the second material handlers. Next, the first and second conveyors are moved in a vertical direction to a first vertical position aligning the first and second conveyors with the first material handler. Material is then transferred from the first material handler to the first conveyor of the elevator conveyor. The first and second conveyors are then moved in the vertical direction to a second vertical position aligning the first and second conveyors with the second material handler, and material is then transferred from the first conveyor of the elevator conveyor to the second material handler.

These and other objects and advantages of the present invention will become more readily apparent during the following detailed description taken in conjunction with the drawings herein.

DETAILED DESCRIPTION OF THE INVENTION

Figure 1:
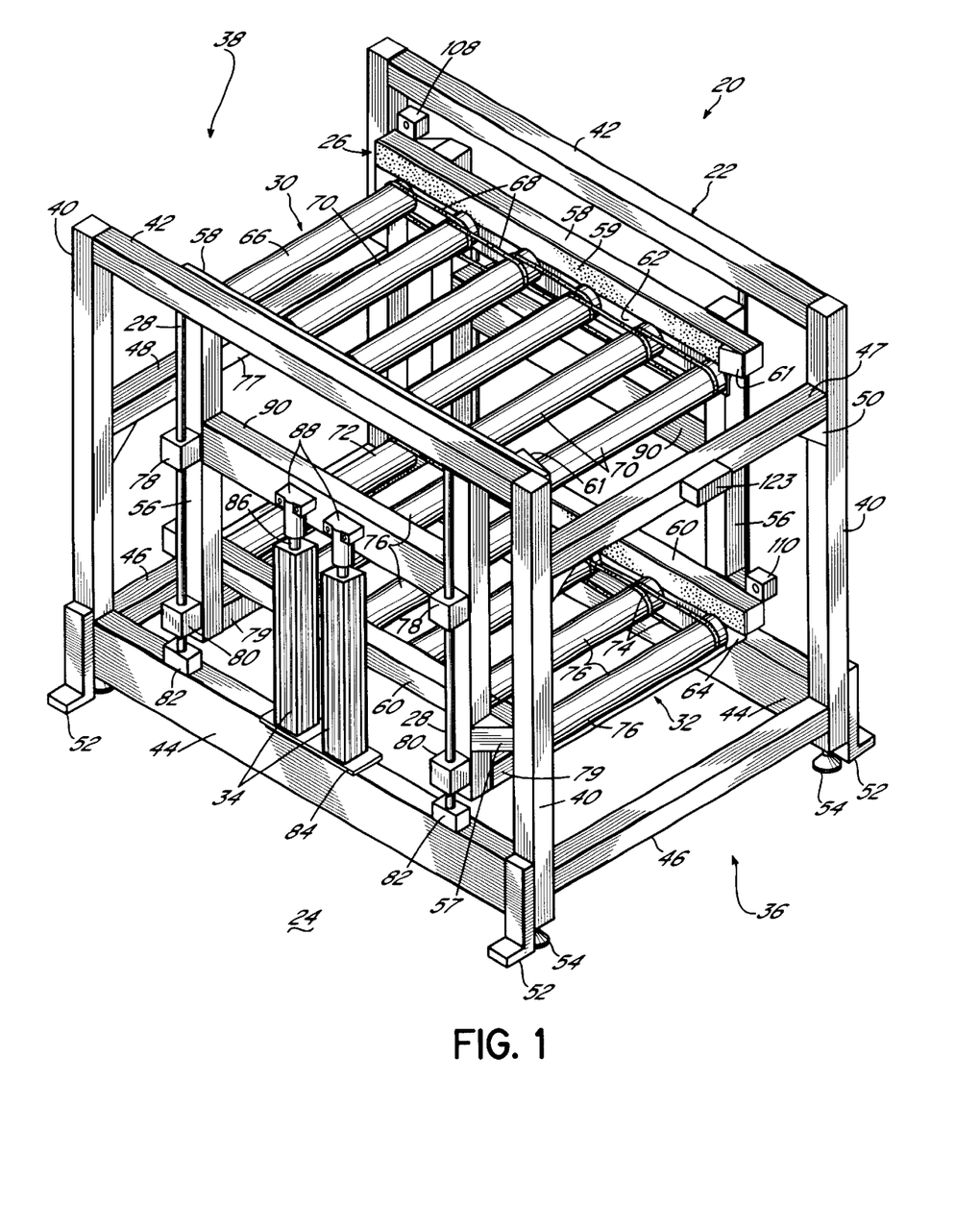
FIG. 1 is a perspective view of a bidirectional elevator conveyor in its lowered position in accordance with the principles of the present invention.
Figure 2:
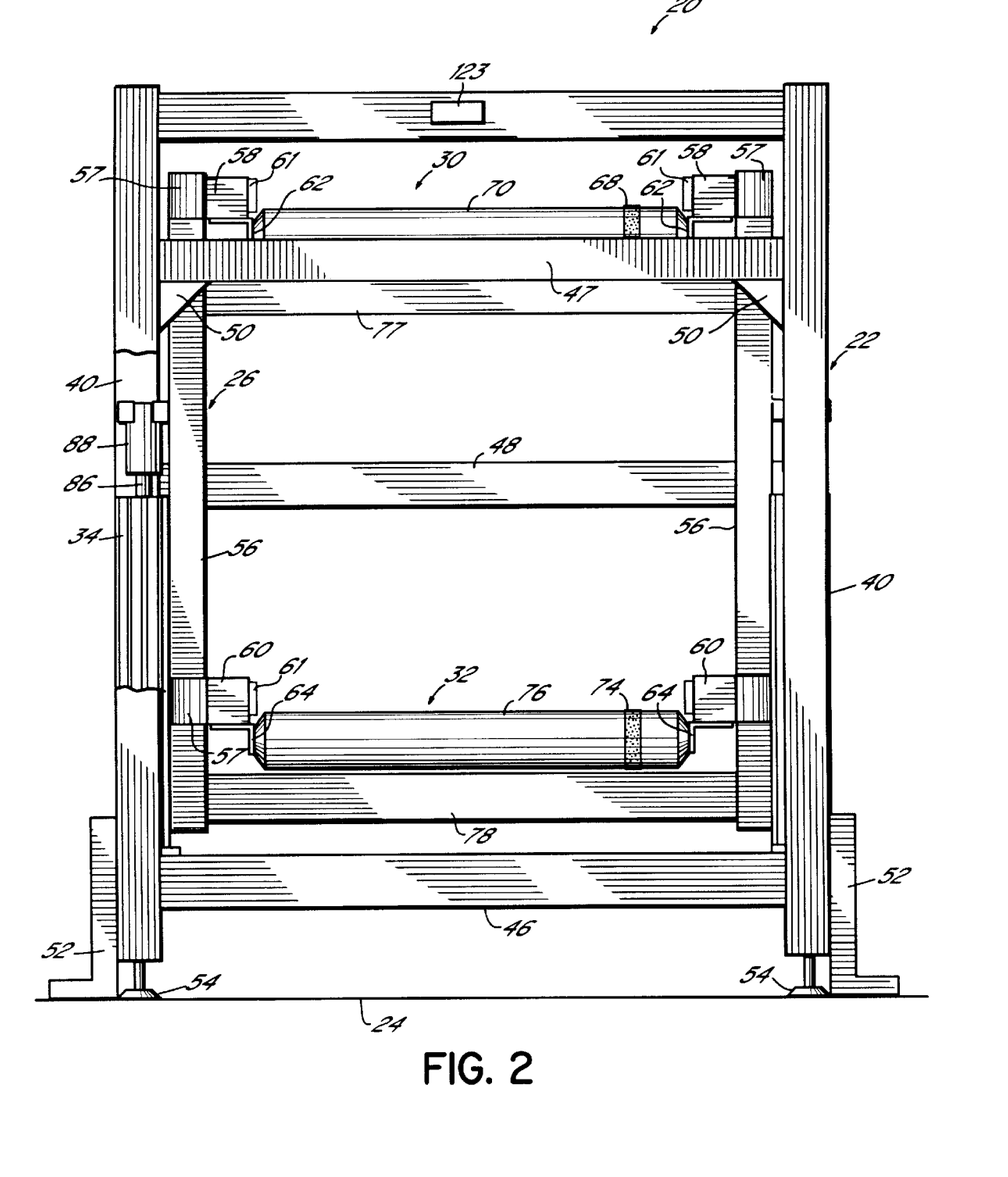
FIG. 2 is an end view of the elevator conveyor of FIG. 1.
Figure 6A:
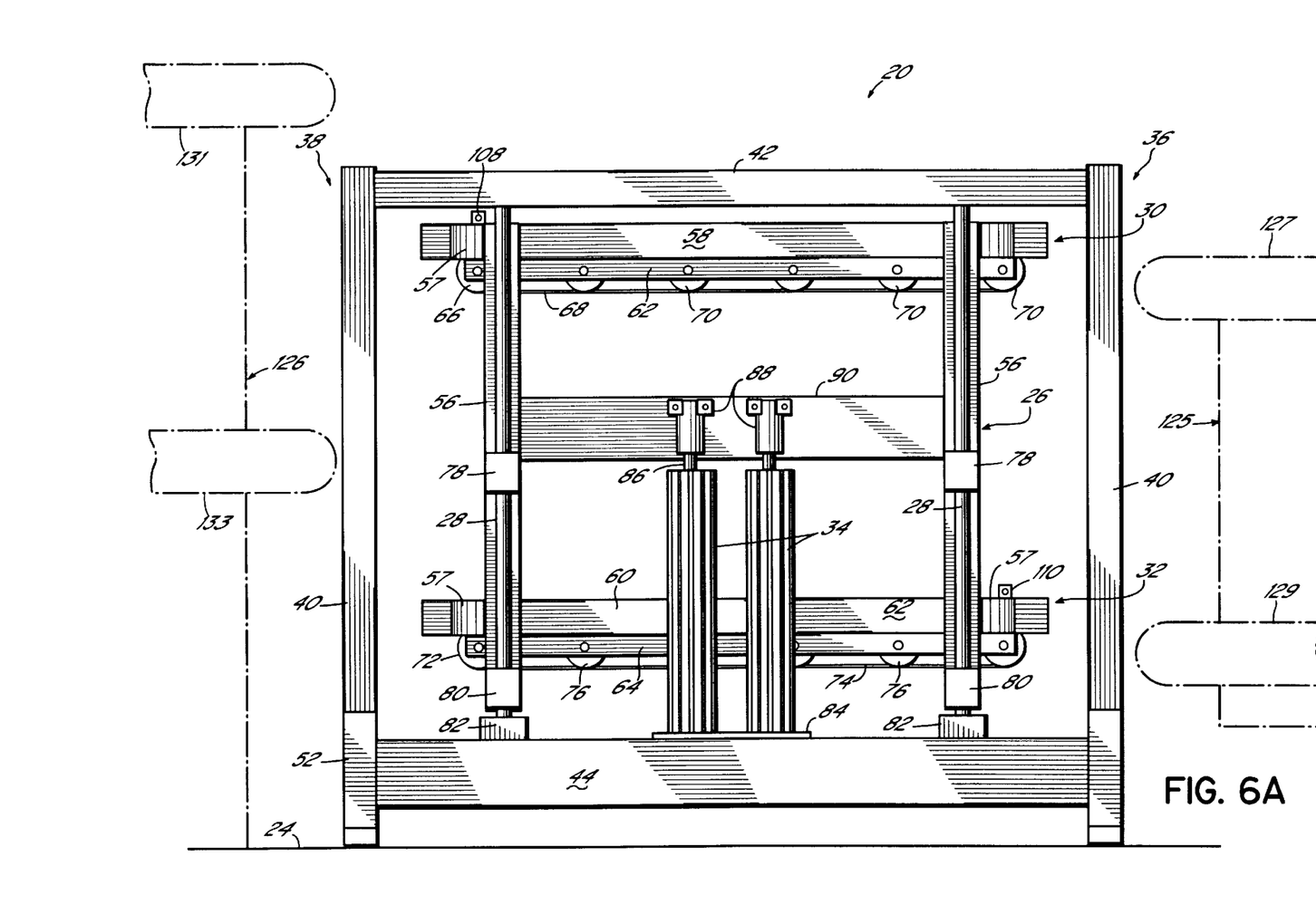
FIGS. 6A and 6B are side views of the elevator conveyor of FIG. 1 in its respective lowered and raised positions. The structure of the outer frame has been removed for clarity.

Referring to FIGS. 1 and 2, an elevator conveyor 20 is comprised of an outer or standing frame 22 mounted to a floor 24 and an inner frame or elevator carriage 26 mounted for vertical motion with respect to the outer frame 22 by means of linear guide rods 28. Upper and lower conveyors 30, 32, respectively, are mounted to the elevator carriage 26. The elevator carriage 26 and conveyors 30, 32 are moved in the vertical direction by pneumatic fluid cylinders 34. The elevator conveyor 20 functions to transfer materials between an AGV 125 (FIG. 6A) located at one end 36 of the conveyor elevator 20 and an ASRS 126 located at an opposite end 38 of the elevator conveyor 20. The need to transfer materials between the AGV 125 and the ASRS 126 exists in many manufacturing and storage facilities. Further, it is common for both the AGV 125 and the ASRS 126 to have respective upper conveyors 127, 131 and respective lower conveyors 129, 133 that are a fixed distance apart, for example, 17 inches. However, it is equally common that the lower conveyor 129 on the AGV 125 is one height, for example, 10 inches, above the floor 24, and the lower conveyor 12 of the ASRS 126 is a different height, for example, 19 inches, above the floor 24. Thus, the conveyor elevator 20 is able to transfer material to and/or from an AGV 125 at the one end 36 with the elevator carriage 26 and conveyors 30, 32 in a lower position as illustrated in FIG. 6A. Thereafter, the cylinders 34 are operated to raise the elevator carriage 26 and conveyors 30, 32 to a higher position (FIG. 6B), thereby permitting the material on the elevator conveyor 20 to be transferred to and/or from conveyors 131, 133 of an ASRS 126 located at the opposite end 38 of the elevator conveyor 20.

The outer frame 22 is a generally rectangular frame structure comprised of four vertical legs or posts 40 located at the corners of the outer frame 22. Upper and lower pairs of outer siderails 42, 44, respectively, are connected to respective upper and lower ends of the legs 40 to form a side frame member. Further, a pair of lower outer crossrails 46 is connected between the vertical posts 40 close to their lower end. First and second upper, outer crossrails 47, 48 are connected to the vertical posts 40 at different elevations to conform to the different elevations of the AGV and ASRS with which the elevator conveyor 20 operates. Further, the outer crossrails 46, 47, 48 provide a desired width to the outer frame 22. The upper, outer crossrails 47, 48 have gussets 50 to further strengthen the outer frame. The upper, outer crossrails 47, 48 and associated gussets 50 are vertically adjustable on the legs 40, so that any potential interference with between the crossrails 47, 48 material moving between the conveyor elevator 20 and interfacing material handling equipment such as an AGV or an ASRS can be eliminated. The legs 40 have respective fixed feet 52 and respective adjustable feet 54. Each of the adjustable feet 54 has a threaded shaft that is screwed into the lower end of a respective vertical leg 40. Thus, the outer frame 22 and the conveyor elevator 20 may be leveled on the floor 24 by utilizing the adjustable feet 54.

The elevator carriage 26 is also a generally rectangular frame structure comprised of four vertical inner posts 56 located generally at the corners of the elevator carriage 26. Upper and lower pairs of inner siderails 58, 60, are connected at the upper and lower ends, respectively, of the vertical posts 56. Wear strips 59 are applied to the opposed inner surfaces of the siderails 58, 60, and guides 61 are attached at the ends of the siderails 58, 60. The carriage 26 has a width that provides a clearance of approximately 0.5 inches between the siderails 58, 60 and the largest pallet or tote to be conveyed across the elevator conveyor 20. The guides 61 have an angled surface so that the pallets or totes are steered toward the middle of the conveyors 30, 32. The wear strips 59 and guides 61 are made of a durable, low friction material, for example, an ultrahigh molecular weight material. Gussets 57 strengthen the connection between the vertical posts 56 and the siderails 58, 60. Upper conveyor siderails 62 are mounted to, and below, the upper, inner siderails 58; and lower conveyor siderails 64 are mounted to, and below, the lower, inner siderails 60. A motorized roller 66 is drivingly connected by means of drive belts 68 to a plurality of, for example, five, idler rollers 70, thereby forming the upper conveyor 30. The ends of the rollers 66, 70 are rotatably mounted within the upper conveyor siderails 62. The lower conveyor 32 is formed by a motorized roller 72 connected by drive belts 74 to a plurality of, for example, five, idler rollers 76. The motorized roller 72 and idler rollers 76 are rotatably connected at their ends to the lower conveyor siderails 64. Upper and lower pairs of inner crossrails 77, 79, respectively, are mounted to the respective upper and lower ends of the vertical posts 56 below the respective conveyors 30, 32.

Each of the vertical posts 40 has upper and lower bearing blocks 78, 80 mounted thereto. The bearing blocks 78, 80 slide on respective linear guides 28. The bearing blocks 78, 80 and linear guides 28 combine to form a linear bearing and can be implemented with many known devices, for example, center bronze bushing or a recirculating ball linear bearing commercially available from Tompson of Port Washington, N.Y. The upper ends of the guide rods 28 are inserted in holes drilled in lower surfaces of the upper, outer siderails 42. The lower ends of the guide rods 28 are mounted to blocks 82 that, in turn, are adjustably mounted to the lower, outer siderails 44. The lower ends of the guide rods 28 are adjustable so that the guide rods 28 can be made as parallel as possible. Thus, the elevator carriage 26 is mounted for motion in the vertical direction on the outer frame 22. The bases of the cylinders 34 are rigidly connected to a mounting plate 84 that, in turn, is mounted by fasteners or other means to one of the lower, outer siderails 44. The cylinders 34 further have rods 86 extending from an upper end thereof and which are connected at their distal ends to respective floating joint blocks 88. The floating joint blocks 88 are implemented with a pivoting joint, for example, a ball and knuckle joint, and are specified and purchased with the cylinders 34. The floating joint blocks 88 are mounted by fasteners or other means to one of a pair of tie bars 90 connected to the vertical posts 56 on opposite sides of the elevator conveyor 26. Thus, by selectively activating the cylinders 34, their respective rods 86 can be extended or retracted to, in turn, respectively raise and lower the elevator carriage 26 with the upper and lower conveyors 30, 32.

The vertical posts 40,56, siderails 42, 58, 60 and crossrails 46, 47, 48, 77, 79 are normally of the same cross-sectional area, whereas, the siderails 44 and tie bars 90 are approximately twice the width for additional strength. The vertical posts 40,56, siderails 42, 44, 58, 60, tie bars 90 and crossrails 46, 47, 48, 77, 79 can be made from any material suitable for such structural members, for example, extruded aluminum beams and associated fasteners commercially available from MB Kit Systems Ltd. of Akron, Ohio. The outer and inner frames are assembled by tapping a center through-hole in the ends of the siderails and crossrails, drilling clearance holes through the sides of the vertical posts at the appropriate locations, and using a threaded fastener to connect the rails together. The conveyor siderails can be made from any stock material that provides sufficient strength, for example, an extruded aluminum right angle bar stock or angle iron. The roller assemblies comprising the conveyors 30, 32 are commercially available from Interroll Corporation of Wilmington, N.C. and the cylinders 34 are commercially available from SMC Pneumatics of Indianapolis, Ind.

Figure 3:
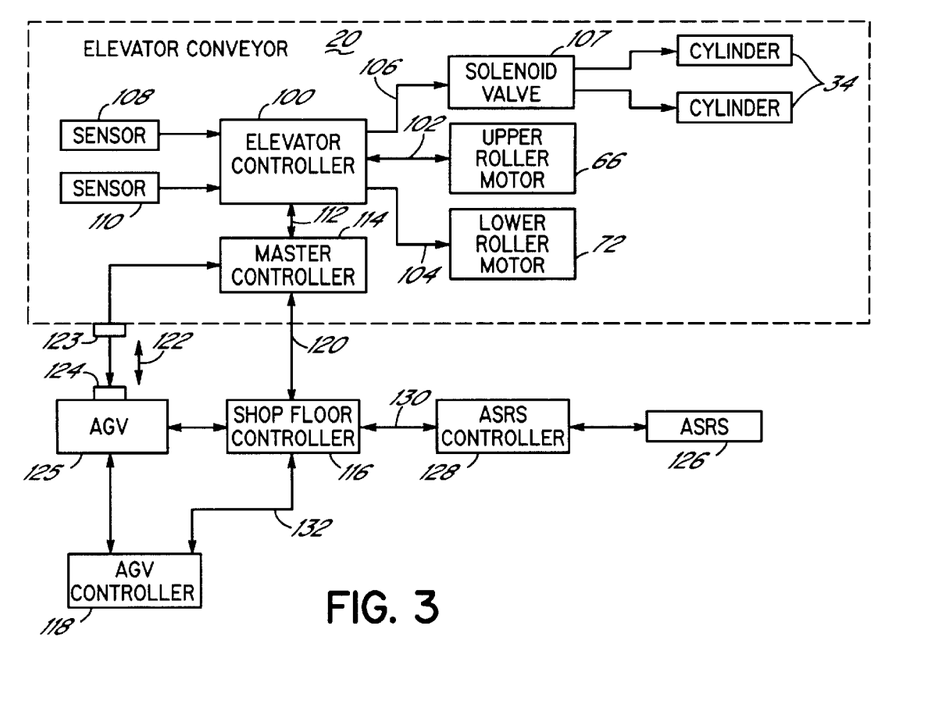
FIG. 3 is a schematic block diagram of the components used to control the elevator conveyor of FIG. 1 as well as control components of other devices operating with the elevator conveyor.

Referring to FIG. 3, the elevator conveyor 20 includes an elevator controller 100 which provides output signals on lines 102, 104 to operate the upper and lower roller motors 66, 72, respectively. In addition, at the appropriate times, the elevator controller 100 provides command signals on an output 106 to a solenoid valve 107 that appropriately ports pressurized air to the cylinders 34, thereby causing the cylinders 34 to either extend or retract their respective cylinder rods 86. The presence and absence of a pallet or tote on the conveyors 30, 32, is detected by respective proximity sensors 108, 110. Referring to FIG. 1, in this example, the proximity sensor 108 is mounted on the inner, upper side rail 58 at the opposite end 38 of the conveyor 30; and the proximity sensor 110 is mounted on the inner, upper side rail 58 at the one end 36 of the conveyor 32. The proximity sensors 108, 110 are often photoreflective sensors, but may be any other type of known proximity sensor suitable for the purpose and environment. The elevator controller 100 is in electrical communication via a communications link 112 with a master controller 114. The elevator controller 100 is normally a commercially available programmable logic controller, and the and the master controller 114 is normally a commercially available personal computer which is more rugged for use in a manufacturing environment. The master controller 114 provides communications with other controllers in the manufacturing environment, for example, a shop floor controller 116 and an AGV controller 118. The communications link 120 between the master controller 114 and the shop floor controller 116 is normally a hard wired link but may also be an RF wireless communications link. Since the AGV 125 and its associated controller 118 are moving along paths within the manufacturing or warehousing facility, the communications link 122 is normally a wireless communications link, for example, an RF communications link. The RF link is implemented using a transmitter/receiver or transceiver 123 located on the conveyor elevator 20 and a transmitter/receiver or transceiver 124 located on the AGV. The ASRS 126 has material handling devices controlled by an ASRS controller 128. The ASRS 126 is a stationary device and therefore, is in electrical communications with the shop floor controller 116 via a communications link 130 that is normally a wired communications link. However, as will be appreciated, the communications link 130 may also be a wireless link.

In use, the shop floor controller 116 coordinates the flow of material through the facility. Material, for example, optical discs, are stacked on spindles which, in turn, are loaded into totes or pallets. During the manufacturing process, a tote of discs is moved by the AGV 125 between a processing station and temporary storage such as the ASRS 128; and when at the ASRS 128, one or more totes of discs is transferred between the AGV 125 and the ASRS 128. In order to move the AGV 125 carrying a tote from one location to another, the shop floor controller 116 commands the AGV 125 along a path between the first location and coordinates the transfer of a tote onto the AGV. Thereafter, the shop floor controller 116 commands the AGV 125 to move to the second location, for example, the ASRS 128. The shop floor controller coordinates a transfer of the tote from the AGV 125 to the elevator conveyor 20 and thereafter, from the elevator conveyor 20 to the ASRS 128.

Upon the AGV 125 receiving a tote from, for example, a processing station, a transceiver on the processing station transmits the identification code of the transferred tote to the AGV controller 118 via the transceiver 124. The identification codes of totes being carried by the AGV 125 are stored in the AGV controller 118. Assume it is desired to transfer a tote from the AGV 125 to the elevator conveyor 20. The shop floor controller 116 first provides a message over the communications link 120 to the master controller 114 of the identification code of the AGV traveling to the elevator conveyor 20 and the identification code of the tote to be transferred to the elevator conveyor 20. The shop floor controller 116 then provides commands to the AGV controller 118 over a communications link 132 causing the AGV 125 to travel to the elevator conveyor 20. Control of the AGV 125 is well known and is not a part of the present invention. As the AGV approaches one end 36 (FIG. 1) of the elevator conveyor 20, it moves into a docking station (not shown) in a known manner and the receiver/transmitters 123, 124 initiate communication between the AGV controller 118 and the master controller 114 apprising the master controller 114 that the AGV 125 having a particular identification code is positioned in the docking station and ready to initiate a transfer.

Figure 4:
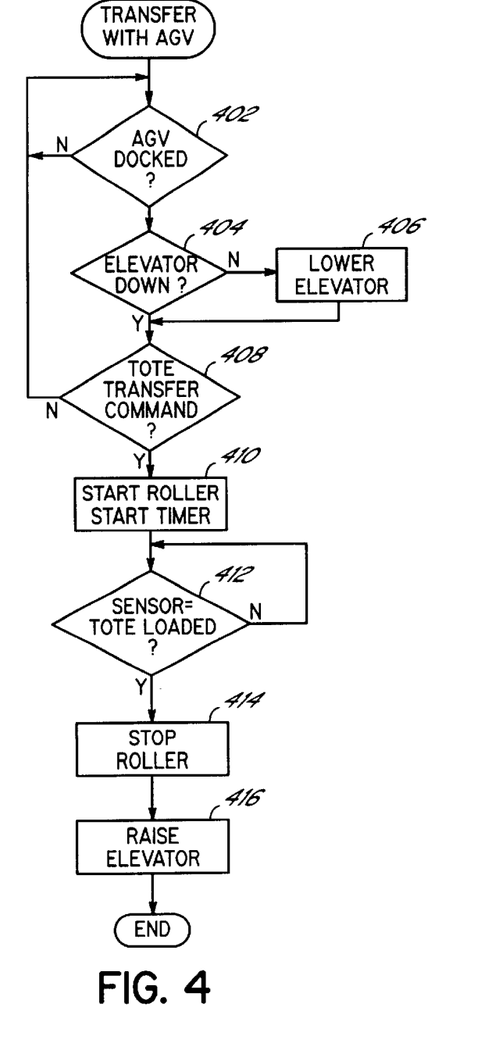
FIG. 4 is a flow chart illustrating a process by which material is transferred between an AGV and the elevator conveyor of FIG. 1.

The process of a transfer of a tote between the AGV 125 and the elevator conveyor 20 is illustrated in FIG. 4. As shown at process step 402, the master controller 114 first determines whether the AGV 125 is properly docked. If so, the master controller 114 then determines, at 404, whether the elevator 26 is in its lower position at which the conveyors 30, 32 are at the same elevation as the upper and lower conveyors 127, 129, respectively, on the AGV 125. If not, the master controller 114, at 406, commands the elevator controller 100 to provide command signals over the output 106 to the solenoid valve 107 to operate the cylinders 34 such that the elevator carriage 26 is moved to its lower position as shown in FIG. 6A. If the elevator conveyor 20 is ready to receive a tote from the AGV 125, that state of readiness is transferred from the master controller 114 to the shop floor controller 116. The shop floor controller 116 then provides a tote transfer command to the master controller 114 and the AGV controller 118.

Upon receiving that command, as detected at 408, the master controller 114 provides, at 410, commands to the elevator controller 100 to start the appropriate motorized conveyor roller 66, 72. Assuming the upper conveyor 30 is receiving a tote from the AGV 125, the elevator controller 100 provides a command on the output 102 to operate the upper motorized roller 66 in a counterclockwise direction as viewed in FIG. 1. As the motorized roller 66 rotates counterclockwise, the drive belt 68 causes the idler rollers 70 to also rotate counterclockwise. Simultaneously, the AGV controller 118 is commanding a conveyor on the AGV 125 to operate in a similar manner to move a tote generally from right to left as viewed in FIG. 1, thereby transferring the tote to the upper conveyor 30. The elevator controller 100 then detects, at 412, that the sensor 108 changes state indicating the tote is loaded on the upper conveyor 30. Immediately thereafter, at 414, the elevator controller 100 changes the state of the signal on the output 102 to cause the upper motorized roller 66 to stop. The elevator controller 100 then transfers data to the master controller 114 indicating that the tote has been successfully loaded onto the upper conveyor 30, and the master controller 114 then passes that data onto the shop floor controller 116.

The AGV 125 has two conveyors 30, 32 and therefore, has the capability of transferring a tote between the elevator conveyor 20 and the AGV 125 via either one or both of the conveyors 30, 32. For example, while a tote is being transferred from the AGV 125 to the upper conveyor 30, it may be desirable to transfer a second tote from the lower conveyor 32 to the AGV 125. The method illustrated in FIG. 4 is also applicable to that process. Upon the master controller 114 receiving a tote transfer command, at 408, the master controller 114 commands the elevator controller 100 to provide signals on the output 104 to operate the lower motorized roller 72 in the clockwise direction. The AGV controller 118 is simultaneously commanding a lower conveyor on the AGV 125 to operate in the clockwise direction. Thus, with the motorized roller 74 and idler rollers 76 rotating clockwise, a tote on the lower conveyor 32 is translated generally left to right as viewed in FIG. 1 off of the lower conveyor 32 and onto a lower conveyor of the AGV 125. As described above, the elevator controller 100 then detects, at 412, a change of state of the sensor 110 indicating that the tote has been transferred off of the lower conveyor 32. Immediately thereafter, at 414, the elevator controller 100 changes the state of the signal on the output 104 to stop the lower motorized roller 66. Next, at 416, the elevator controller 100 provides a signal on output 106 commanding the solenoid valve 107 to port pressurized air to the cylinders 34 to raise the elevator carriage 26 with the conveyors 30, 32 to a position shown in FIG. 6B. The elevator controller 100 then transfers data to the master controller 114 indicating that the tote has been successfully transferred off of the lower conveyor 30, and the master controller 114 then passes that data onto the shop floor controller 116.

Figure 5:
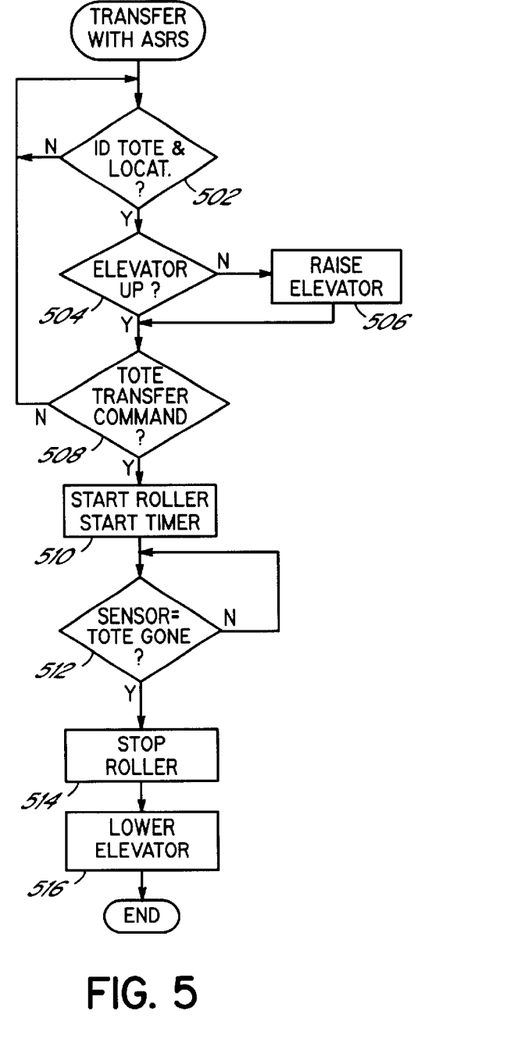
FIG. 5 is a flow chart illustrating a process by which material is transferred between an ASRS and the elevator conveyor of FIG. 1.
Figure 6B:
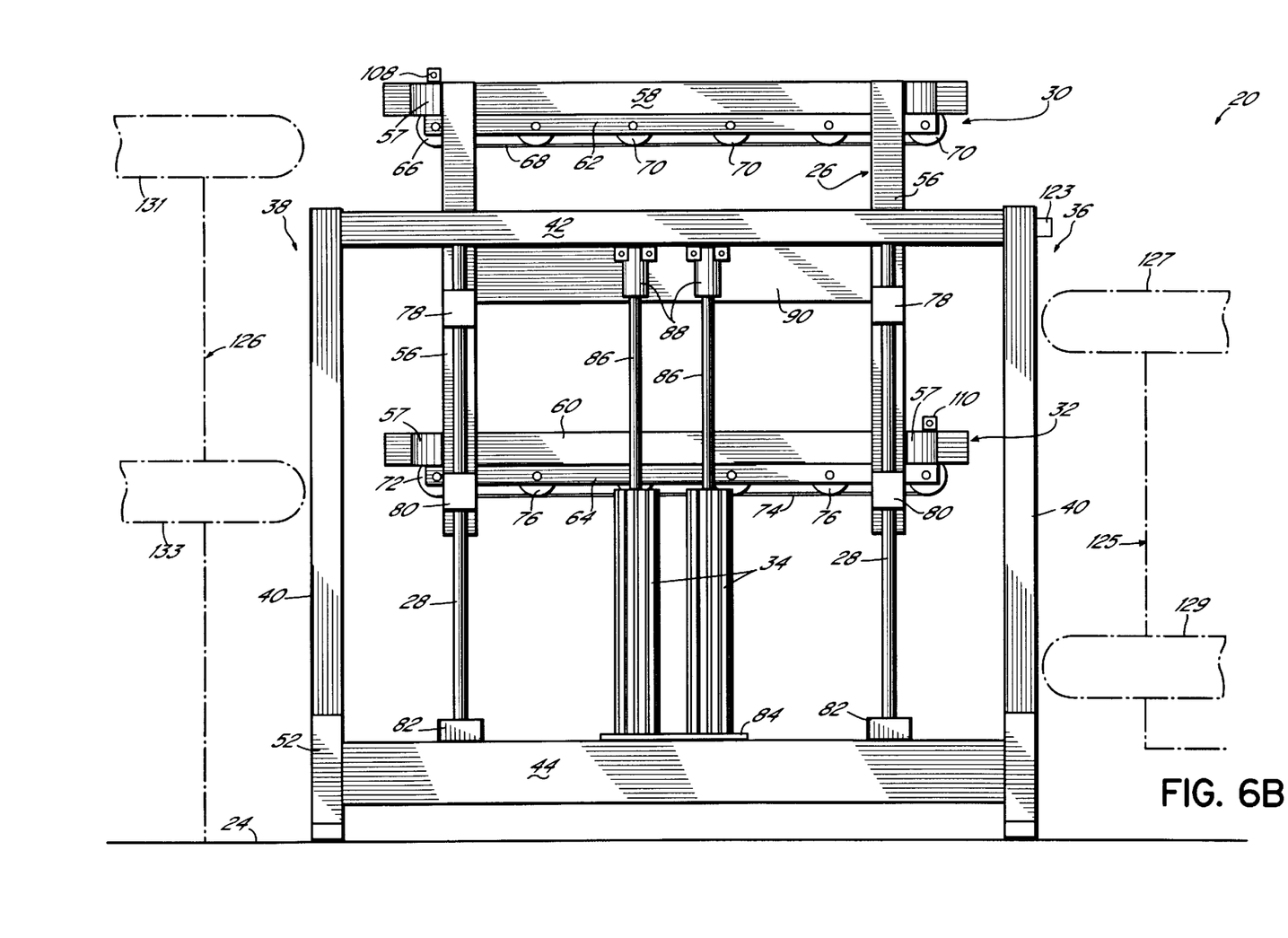

In the process just described, a tote was loaded from the AGV 125 to the upper conveyor 30, and now it is desirable to move that tote to the ASRS. A process for moving material between the ASRS and the elevator conveyor 20 is illustrated in FIG. 5. In the process of loading the tote onto the elevator conveyor, the master controller 114 has transmitted information to the shop floor controller 116 that a tote having a particular identification is loaded on the upper conveyor 30 of the elevator conveyor 20. The shop floor controller 116 then, at 502, confirms the tote identification to the master controller 114. At 504, the master controller 114 detects whether the elevator 26 is in its upper position at which the conveyors 30, 32 are at the same elevation as the upper and lower conveyors 131, 133, respectively, on the ASRS 126. If not, the master controller 114, at 506, provides command signals over the communications link 112 to the elevator controller 100, requesting the elevator 26 be raised to the position shown in FIG. 6B. The elevator controller 100 then provides signals on the output 106 to the solenoid 107 that ports fluid to the cylinders 34 such that the cylinder rod 86 is extended to its uppermost position, thereby raising the elevator 26 to its upper position as shown in FIG. 6B.

Thereafter, at 508, the master controller 114 awaits a tote transfer command from the shop floor controller 116. In this situation, the shop floor controller 116 is coordinating the operation of the ASRS 126 via the ASRS controller 128 and communications link 130. When the shop floor controller 116 determines that the elevator conveyor 20 and the ASRS 126 are in respective states suitable to execute a transfer of the tote from the elevator conveyor 20 to the ASRS 126, a tote transfer command is issued to the master controller 114 and ASRS controller 128. The master controller 114 detects the tote transfer command, at 508, and at 510, initiates a command to the elevator controller 100 to provide a signal on the output 102 causing the upper motorized roller 66 to rotate counterclockwise, thereby moving the tote in a generally right to left direction as viewed in FIG. 1. Simultaneously, the ASRS controller 128 provides a signal to a conveyor on the ASRS 126 to rotate the conveyor rollers counterclockwise. When the elevator controller 100, at 512, receives a signal from the sensor 108 indicating that the tote has moved past the sensor 108, the elevator controller 100 changes the state of the signal on output 102 causing the upper motorized roller 66 to stop.

As in the prior example, while a tote is being transferred from the elevator conveyor 20 to the ASRS 126 via the upper conveyor 30, a tote may be transferred from the ASRS 126 to the lower conveyor 32. In that situation, a process similar to the previously described process of FIG. 5 is executed except that the lower motorized roller 72 is commanded to operate in a clockwise direction, thereby moving the tote in a right to left direction as viewed in FIG. 1. Upon the elevator controller 100 detecting either, at 512, a change in state in the sensor 110 indicating that the tote is no longer on the lower conveyor 32, a command signal, at 514, is given to stop the operation of the lower motorized motor 72. Thereafter, the master controller 114 provides a command, at 516, to the elevator controller 100 to move the elevator 26 to its lower position as shown in FIG. 6A in anticipation of an exchange of totes with an AGV 125.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, in the described example, the upper conveyor 30 is used to transfer material in one direction across the elevator conveyor and the lower conveyor 32 is used to transfer material in an opposite direction. As will be appreciated, the motorized rollers 66, 72 can be operated by the elevator controller 100 in either direction; and therefore, the conveyors 30, 32 can be used singularly or together to transfer material in the same or different directions. In addition, the motorized rollers 66, 72 may be placed at any location on the respective conveyors 30, 32 with respect to the respective idler rollers 70, 76 that is consistent with the manufacturer's instructions for use. Further, as will be appreciated, the location of the sensors 108, 110, or the use of additional sensors, is well within the skill of the art to detect the presence and absence of material on the conveyors 30, 32 as required by the desired use of the conveyors 30, 32.

The conveyor elevator 20 is described as being made from extruded aluminum, however, other materials may also be used that sufficiently support the totes which, when fully loaded, weigh up to 100 pounds apiece and the conveyors 30, 32 which together weigh up to 100 pounds. Further, in the described embodiment, a pair of cylinders 34 is used to lift and lower the elevator carriage 26 because of their size and cost. As will be appreciated, a single cylinder may be used in place of the pair of cylinders 34. However, the single cylinder will probably be physically larger and may be more expensive than the pair of cylinders 34. In addition, it will be appreciated that the cylinders 34 may be mounted on either side of the conveyor elevator 20 or on both sides. Mounting a cylinder on each side of the conveyor elevator 20 may be preferred if the conveyor elevator 20 is made wider and mounting the cylinders 34 on one side results in unacceptable moment arms and torque. Further, in the described embodiment of the conveyor elevator 20, the linear bearings 28, 78, 80 are spread out and separated from the cylinders 34 in order to reduce moments in the operation of the cylinders 34, however, as will be appreciated, the linear bearings 28, 78, 80 may be integrated within, and purchased as part of, the cylinders 34.

Therefore, the invention in its broadest aspects is not limited to the specific details shown and described. Consequently, departures may be made from the details described herein without departing from the spirit and scope of the claims which follow.

What is claimed is:

1. A multiple conveyor elevator for moving articles between the multiple conveyor elevator and different material handling equipment comprising:
   a frame having upper and lower side rails on one side of the frame;
   a carriage mounted on the frame and movable in a substantially vertical direction with respect to the frame, the carriage including
      a first conveyor capable of moving the articles thereon, and
      a second conveyor having a vertical location on the carriage different from the first conveyor and capable of moving the articles thereon;
   a guide rod mounted between the upper and lower side rails;
   a linear bearing connected to one side of the carriage and mounted for sliding motion on the guide rod; and
   a cylinder connected to the frame and having a cylinder rod connected to the carriage, the cylinder being operable to move the carriage and the first and second conveyors in a substantially vertical direction on the guide rod between first and second vertical positions.

2. The multiple conveyor elevator of claim 1 further comprising:
   a first sensor for detecting a presence of an article on the first conveyor; and
   a second sensor for detecting a presence of an article on the second conveyor.

3. The multiple conveyor elevator of claim 1 wherein the frame further comprises:
   four generally vertical legs, the upper and lower side rails on the one side of the frame being connected to respective upper and lower ends of two legs on one side of the frame;
   upper and lower siderails on an opposite side of the frame connected to respective upper and lower ends of the legs on an opposite side of the frame;
   crossrails connected between the legs and being substantially perpendicular to the siderails.

4. The multiple conveyor elevator of claim 3 further comprising:
   a first guide rod mounted between two of the siderails on one side of the frame;
   a first linear bearing connected to one side of the carriage, the first linear bearing mounted for sliding motion on the first guide rod;
   a second guide rod mounted between two of the siderails on an opposite side of the frame; and
   a second linear bearing connected to an opposite side of the carriage, the second linear bearing mounted for sliding motion on the second guide rod.

5. The multiple conveyor elevator of claim 4 further comprising:
   a third guide rod mounted between two of the siderails on the one side of the frame and displaced from the first guide rod;
   a third linear bearing connected to the one side of the carriage, the third linear bearing mounted for sliding motion on the third guide rod;
   a fourth guide rod mounted between two of the siderails on the opposite side of the frame; and
   a fourth linear bearing connected to the opposite side of the carriage, the fourth linear bearing mounted for sliding motion on the fourth guide rod.

6. The multiple conveyor elevator of claim 4 wherein an end of the cylinder is connected to one of the siderails and an end of the cylinder rod is connected to carriage.

7. The multiple conveyor elevator of claim 4 wherein the cylinder comprises a pair of cylinders, each of the cylinders having a cylinder rod, the ends of the cylinders being connected to one of the siderails and ends of the cylinder rods being connected to a side of the carriage.

8. The multiple conveyor elevator of claim 6 wherein the end of the cylinder is connected to one side of the frame proximate a midpoint of the one of the siderails.

9. The multiple conveyor elevator of claim 3 wherein lower ends of each of the legs has a foot adjustably connected to a respective one of the legs for supporting the frame on a surface.

10. The multiple conveyor elevator of claim 1 wherein the carriage further comprises:
    four generally vertical posts;
    siderails connected to lower and upper ends of the posts on opposite sides of the carriage;
    crossrails connected between the posts and being substantially perpendicular to the siderails.

11. The multiple conveyor elevator of claim 10 further comprising a cylinder rail connected between two of the posts and being connected to an end of the cylinder rod.

12. The multiple conveyor elevator of claim 11 wherein the end of the cylinder rod is rotatably connected to the cylinder rail.

13. The multiple conveyor elevator of claim 11 wherein inner opposed surfaces of the siderails of the carriage have wear strips.

14. The multiple conveyor elevator of claim 11 wherein the cylinder rail is parallel to a siderail.

15. The multiple conveyor elevator of claim 1 wherein each of the first and second conveyors is comprised of a plurality of conveyor rollers wherein one of the conveyor rollers is a drive roller and others of the conveyor rollers are idler rollers, the drive roller being linked to the idler rollers to impart a rotation to the idler rollers.

16. An apparatus for handling articles comprising:
    an elevator conveyor having a first side for receiving articles and a second side for discharging the articles, the elevator conveyor including first and second conveyors;
    a first material handler disposed adjacent the first side of the elevator conveyor and having third and fourth conveyors located at first and second heights;
    a second material handler disposed adjacent the second side of the elevator conveyor and having fifth and sixth conveyors located at third and fourth heights, the first and second conveyors of the elevator conveyor being movable to the first and second heights, respectively, and operable to transfer the articles between the first and second conveyors of the elevator conveyor and the third and fourth conveyors, respectively, of the first material handler, and the first and second conveyors on the elevator conveyor being movable to the third and fourth heights, respectively, and operable to transfer the articles between the first and second conveyors of the elevator conveyor and the fifth and sixth conveyors, respectively, of the second material handler.

17. A method of transferring articles between first and second material handlers and a conveyor elevator having first and second conveyors, the first material handler having upper and lower conveyors at different heights from respective upper and lower conveyors on the second material handler, the method comprising the steps of:

locating the conveyor elevator between the first and second material handlers;

moving the first and second conveyors in a vertical direction to vertical positions aligning the first and second conveyors with the respective upper and lower conveyors on the first material handler;

transferring material between the upper and lower conveyors of the first material handler and the first and second conveyors of the elevator conveyor;

moving the first and second conveyors in the vertical direction to vertical positions aligning the first and second conveyors with the respective upper and lower conveyors on the second material handler;

transferring material between the first and second conveyors of the elevator conveyor and the respective upper and lower conveyors of the second material handler.

18. The method of claim 17 further comprising transferring material from the second conveyor of the conveyor elevator to the second material handler substantially simultaneously with transferring material from the first material handler to the first conveyor of the elevator conveyor.

19. The method of claim 17 further comprising transferring material from the second material handler to the second conveyor of the conveyor elevator substantially simultaneously with transferring material from the first conveyor of the conveyor elevator to the first material handler.

20. The method of claim 17 further comprising:

initiating operation of the first conveyor to move the material in a desired direction onto the first conveyor;

detecting a presence of the material on the first conveyor; and stopping the operation of the first conveyor in response to detecting the presence of the material on the first conveyor.

21. The method of claim 17 further comprising:

initiating operation of the second conveyor to move the material in a desired direction off of the first conveyor;

detecting an absence of the material on the second conveyor; and stopping the operation of the second conveyor in response to detecting the absence of the material on the second conveyor.

* * * * *

UNITED STATES PATENT AND TRADEMARK OFFICE
CERTIFICATE OF CORRECTION

PATENT NO.      : 6,394,257 B1
DATED           : May 28, 2002
INVENTOR(S)     : Tracy Eugene Wheeler It is certified that error appears in the above-identified patent and that said Letters Patent is hereby corrected as shown below:

Column 3,
Line 25, reads "lower conveyor 12 of" and should read -- lower conveyor 133 of --.

Column 11,
Line 9, reads "material handier" and should read -- material handler --.

Signed and Sealed this

Twenty-eighth Day of January, 2003

JAMES E. ROGAN
*Director of the United States Patent and Trademark Office*